United States Patent [19]

Beggs et al.

[11] 3,926,617

[45] Dec. 16, 1975

[54] PASSIVATION OF METALLIZED PELLETS IN BULK

[75] Inventors: Donald Beggs, Toledo, Ohio; William A. Ahrendt, Lambertville, Mich.

[73] Assignee: Midrex Corporation, Charlotte, N.C.

[22] Filed: Sept. 6, 1974

[21] Appl. No.: 503,601

Related U.S. Application Data

[63] Continuation of Ser. No. 334,228, Feb. 21, 1973, abandoned.

[52] U.S. Cl. ............................................. 75/.5 BA
[51] Int. Cl.² .......................................... B22F 9/00
[58] Field of Search .............. 75/.5 R, .5 BA, .5 AA; 148/126

[56] References Cited
UNITED STATES PATENTS

| | | | |
|---|---|---|---|
| 2,677,669 | 5/1954 | Ahlberg | 252/472 |
| 2,766,108 | 10/1956 | Eberhardt | 75/.5 BA |
| 3,615,340 | 10/1971 | Fuqua et al. | 75/.5 BA |
| 3,617,394 | 11/1971 | Mayer | 75/.5 BA |

*Primary Examiner*—L. Dewayne Rutledge
*Assistant Examiner*—Arthur J. Steiner
*Attorney, Agent, or Firm*—Morgan, Finnegan, Pine, Foley & Lee

[57] ABSTRACT

A batch process is provided for passivating metallic iron particles in a bulk mass which mass is placed within a container. The container is periodically purged with a gas containing oxygen and in between each purge, the particles are permitted to react while in a quiescent state with the gas. This cyclical process is repeated until the reactivity rate of the particles is substantially reduced to produce particles which not only are passivated but also retain a high degree of metallization.

4 Claims, 3 Drawing Figures 3,926,617

PASSIVATION OF METALLIZED PELLETS IN BULK

This is a continuation of application Ser. No. 334,228, filed Feb. 21, 1973, now abandoned.

BACKGROUND OF THE INVENTION

In recent years there has been a great deal of activity in the production of iron particles, pellets, briquets, and the like from the direct reduction of iron ores, which hereinafter will be collectively referred to as metallized pellets. Utilizing these metallized pellets allows one to produce steel by feeding such pellets directly to an electric arc furnace without the high capital investment required in large steel plants.

One of the problems associated with the use of metallized pellets is their inherent nature to reoxidize upon exposure to ambient conditions. Such reoxidation causes problems relative to the shipment of these pellets, whether by barge, railway, trucks or the like. There have been many attempts to overcome, or diminish, the reoxidation of metallized pellets through the use of organic and inorganic coatings, and by reducing the exposed surface area. Most of these attempts have been relatively unsuccessful as they fail to substantially passivate the particles and/or the resulting process is too expensive. Additionally, most of the investigators have worked with small quantities of materials and/or small, sometimes dust-like, particles sizes. One of the more interesting methods for passivating active particles of reduced iron ores has been disclosed in U.S. Pat. No. 3,615,340 to B. B. Fuqua et al. This patent discloses passivating particulate metals in a fluidized bed at temperatures ranging from 90°F to about 650°F. in a mildly oxidizing gas such as steam or oxygen diluted with steam, or with inert gases mixed with oxidizing gases such as steam or oxygen or both. Fuqua et al teach that the mildly oxidizing gas should contain no more than 12 percent free oxygen. Unfortunately, this process is limited to particles which can be treated in a fluidized bed, and there has been no successful method for passivating large quantities of bulk materials, particularly pellets having an individual volume larger than 0.02 cubic inch which mass may necessarily include a small percentage of fines associated with such pellets.

It is, accordingly, a primary objective of the present invention to provide a method for passivating metallized pellets and fines associated therewith in bulk, each pellet having a minimum volume of approximately 0.02 cubic inch.

More particularly, it is an object of this invention to provide a method for altering the character of metallized pellets to an extent that the same may be shipped in either railroad cars, holds of ships, barges and the like with substantially no oxidation taking place.

Still more particularly, it is an object of this invention to provide an economical method of passivating metallized pellets in a short period of time.

It is a further object of passivating large quantities of metallized pellets in ambient conditions and without resort to generated atmospheres.

It is another object of the invention to passivate metallized pellets at relatively low temperatures.

SUMMARY OF THE INVENTION

This invention contemplates passivating bulk masses of metallized pellets so that oxidation thereafter may be substantially eliminated while the pellets are being shipped, stored, handled or conveyed. The term "bulk mass" as used throughout the specification and accompanying claims is intended to define a sufficient quantity of pellets oriented in such a geometrical arrangement so that heat generated during passivation will be retained. The thermal conductivity of a bulk mass of metallized pellets was found to be approximately 4 $Btu/ft^2/hr/°F/in$. By comparison, the thermal conductivity of insulating block is 1 $Btu/ft^2/hr/°F/in$. and for fire brick it is 9. Thus, the pellets act as self-insulators thereby tending to retain the heat of reaction. This invention incorporates this observation of an element in a novel passivating process.

Freshly reduced metallized pellets may be treated in a bin, silo, stockpile or the like. Preferably, the pellets are treated in a container, such as a bin, where the flow of a gas containing oxygen through the bin may be uniformly distributed and controlled. The freshly reduced pellets may be at a temperature such that no further treatment is necessary before their introduction to the bin; however, it may be necessary to either heat or cool the pellets at a temperature between 100°–250°F. before, or after, they are placed in the bin.

It has been found that the bin should be completely enclosed with a solid base in order to prevent external air from flowing upwardly in uncontrolled fashion and a roof to protect the pellets from precipitation. Controlled means for supplying a flow of gas containing oxygen uniformly throughout the bulk mass of metallized pellets is provided. The gas containing oxygen is ventilated upwardly through the pellets periodically and the temperature of the bed is checked to insure that the pellets have not overheated. Between the periodic venting of gas, the pellets are allowed to remain in a quiescent state, i.e., no mind drafting at which time the metallized pellets will react with the oxygen in the vented gas which eventually, after periodic quiescence and venting, results in passivation.

Fast cooling may be achieved in order to reduce the amount of time the bins are full of pellets. After the pellets have been passivated, a cooling gas may be continuously passed through the bed in order to induce cooling of the pellets.

DESCRIPTION OF PREFERRED EMBODIMENTS

Figure 1:
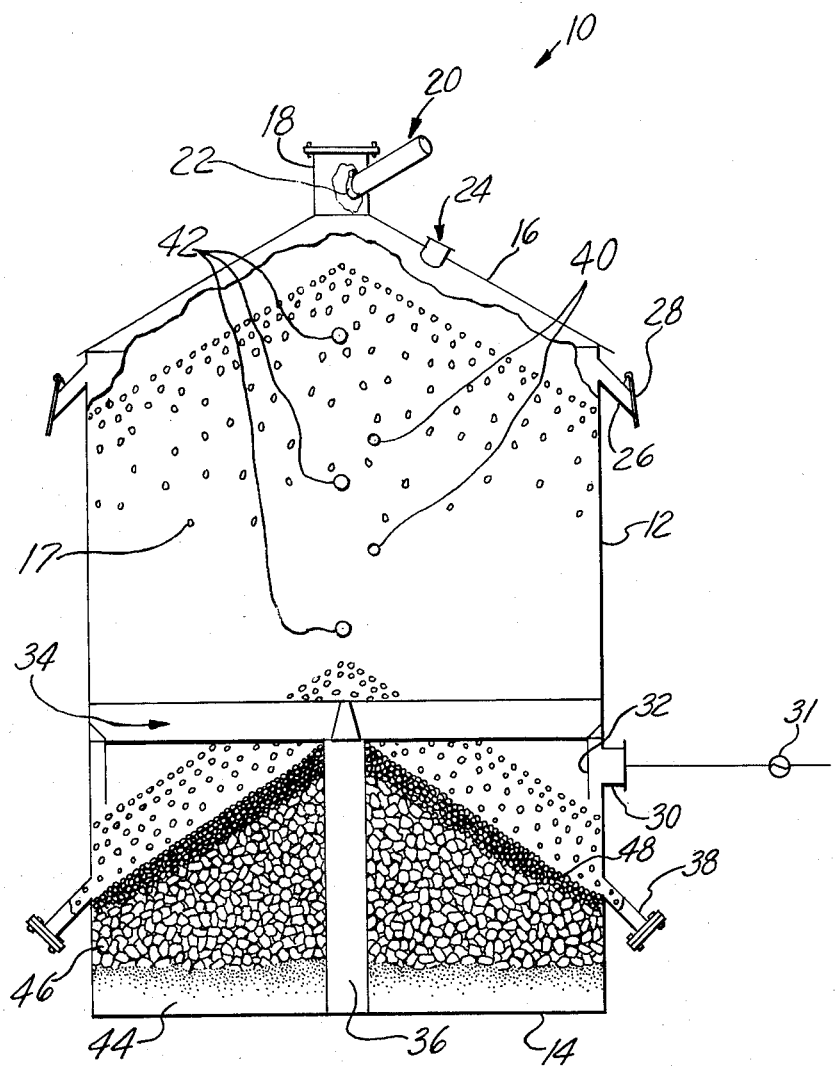
FIG. 1 is an elevational cross-sectional view, partially schematic, of a bin in which the present invention may be conducted.

It has been discovered that considerable tonnages of metallized pellets, each having a volume for the most part of at least 0.02 cubic inch, may be passivated in the presence of a gas containing oxygen if the proper conditions are met. It was initially found that placing the pellets in a container would result in the pellets slowly increasing in temperature, but reaching a plateau instead of continually rising in temperature. Upon investigation, it was found that these pellets had achieved a degree of passivation. With such passivation, the metallized pellets were rendered passive and could be subsequently handled, stored, transported or conveyed with further oxidation being substantially reduced. Upon further investigation, it was found that the passivation could be carried out advantageously by directing the gas containing oxygen through the pellets in a regulated manner.

It was found during investigations associated with this invention that the quantity of oxygen in the gas does not greatly affect the reactivity rate. In fact, a gas containing only 2 percent oxygen was found capable of use in the passivation of metallized pellets. Obviously, the most practical gas containing oxygen is air, and the passivation method is to a great extent taught in this specification through the use of air; however, it will be appreciated that gases with various percentages of oxygen can also be used for the passivation process of this invention.

In order to study the nature of passivation, a first group of fresh metallized pellets having an average diameter of ⅜ inch was heat treated in a wet, mildly oxidizing gas for two hours at 400°F. and a second group for two hours at 600°F. under the same conditions. The 400°F. treated pellets displayed a light straw color and had lost approximately 1.0 percent metallization. The 600°F. treated pellets displayed a dark blue color and had lost approximately 4.0 percent metallization. In both treatments, the rate of oxygen pickup from air was reduced by a factor of 10 as compared to fresh pellets. In both instances, a degree of passivation was achieved but metallization loss at these temperatures was commercially unacceptable. Therefore, tests were conducted at lower temperatures to determine if passivation at an acceptable level of metallization loss could be achieved.

By conducting various oxidation rate tests, it was discovered that exposing pellets to air at a temperature of 200°F. for 1 to 2 days resulted in significant passivation without any discoloration or significant loss of metallization. This exposure reduced oxidation by a factor of 80 as compared to fresh pellets. This improvement contrasts to the factor of 10 in the study discussed above.

During the 200°F. exposure, the pellets were found to consume oxygen from the air at a declining rate, which rate approached 0 after 2 days. The exact mechanism is not known, but it is believed that an incipient iron oxide skin is gradually formed on the metallized pellets, which oxide skin retards further oxidation in much the same manner that a gunmetal blue oxide retards further oxidation of steel. It was found that no passivation occurs when metallized pellets are subjected to a nitrogen atmosphere at 200°F. for 2 days. This agrees with the belief that the passivation mechanism is dependent upon an incipient formation of an iron oxide, rather than a physical change taking place.

More particularly, the metallized pellets in the test at 200°F. referred to above were exposed to air at 200°F. in a conventional electrically heated drying oven, which type oven is provided with vents for natural draft circulation of air through the oven. The pellets were loaded in a shallow layer so they would heat up to, and remain at, oven temperature during the exposure period. At the end of the exposure period, the pellets were removed and allowed to cool to ambient and then were subjected to a reactivity test.

Specifically, this reactivity test was made by placing three pounds of pellets in a two liter jar, purging with nitrogen, heating up the jar in an oven furnace, purging out the nitrogen with air and then allowing the jar to "breathe" in air through a wet test meter for a 4 hour period. At the end of this period, the percent oxygen content in the jar was analyzed by Orsat and a computation made of the average hourly rate of oxygen reacted. Since only an approximate rate of oxygen reacted from air was sought, air, rather than pure oxygen, was allowed to breathe in through the wet test meter. Because of the relatively small volume consumption of oxygen in most of the tests, Orsat results were used rather than a wet test meter.

The reactivity rate in air of metallized pellets is expressed in cubic feet of oxygen reacted per hour per long ton of metallized pellets (CFH $O_2$/LT). It was found that the metallized pellets in the 200°F. test experienced substantial reduction in reactivity rate and were thus passivated. The following is a tabulation of the results of laboratory reactivity tests of fresh, or unpassivated, pellets, and of the passivated pellets:

TABLE I

| Temperature of Exposure-°F. | Time of Exposure-Days | Temperature of Reactivity Test-°F. | Reactivity Rate CFH $O_2$/LT |
|---|---|---|---|
| (Fresh Pellet Check) | | 125 | 0.4 |
| " | | 150 | 0.8 |
| " | | 200 | 8.0 |
| 200 | 1 | 200 | 0.5 |
| 200 | 2 | 200 | 0.1 |
| 200 | 2 | 125 | 0.0 |

In view of the reduction in reactivty rate at 200°F., a factor of 80, by those pellets having prior exposure to air at 200°F. for two days, further tests were conducted. That is, the laboratory tests externally force heated the pellets to a constant temperature and it was now desired to determine, as mentioned above, if the pellets in the bulk mass, representing commercial conditions, could be similarly passivated without externally heating the bulk.

A bulk mass condition was simulated by housing a mass of fresh pellets in an uninsulated container 15 feet wide, 20 feet long and 8 feet high with an airtight bottom and sidewalls, but free to breathe air in from the top, to determine if the same would heat up by diffusion of air down into the mass, level out from progressive passivation and then cool down by natural convection air currents. It was calculated that the natural heat loss through the walls of the container would prevent fresh pellets in the region of the wall from heating up and the relatively cool pellets in the wall region would provide the means for ambient air to "stack" down into the bottom of the mass and ultimately cool it off. It could not be calculated, however, how hot a mass of pellets of a given width and depth would heat before becoming sufficiently passivated to cease heating and start cooling. This, as well as the period, had to be determined experimentally.

Table II shows the bulk temperature history at various thermocouple locations during the above described test. While the pellets were being unloaded and reloaded back into the test cell, samples of pellets from thermocouple locations numbered 1–4 were analyzed. The results of these tests are as follows:

TABLE II

| Sample Location | Distance From Surface-Feet | | | Max. Temperature Attained at Location | Reactivity Rate CFH $O_2$/LT at 125°F. | Reactivity Rate CFH $O_2$/LT at 200°F. |
|---|---|---|---|---|---|---|
| | Floor | End Wall | Side Wall | | | |
| (Fresh Pellet) | | | | | 0.4 | 8.0 |
| TC No. 1 | 5 | 3 | 7.5 | 215 | 0.0 | 0.6 |
| TC No. 2 | 3 | 5 | 4 | 185 | 0.0 | 0.9 |
| TC No. 3 | 5 | 10 | 7.5 | 220 | 0.0 | 0.2 |
| TC No. 4 | 3 | 5 | 4 | 164 | 0.0 | 0.6 |

It was determined experimentally that the reactivity rate of fresh pellets is a function of $(T)^{8.53}$ where T is the test temperature in °F. In two separate further lab tests, the reactivity rate of passivated pellets was also found to be very close to the above function of $(T)^{8.53}$.

It was also determined experimentally that the reactivity rate of a fresh pellet is related to the 0.28 power of the oxygen concentration. Thus, the reactivity rate of a fresh pellet in 2 percent oxygen-98 percent nitrogen is about half as great as in air. Importantly, it was concluded that a bulk mass of pellets could attain an adequate level of passivation in a quiescent state without an external source of heat.

Accordingly, a program to establish commercial passivation of pellets in a bulk mass was undertaken. This program employed a bin with suitable controls to regulate the gas containing oxygen introduced in the bin so that the entire bin received uniform exposure to the gas and simulated the quiescent characteristics of the bulk mass previously obtained in the afore-mentioned bulk test. This bin is shown generally at 10 in FIG. 1 and has a circumferential wall 12, a floor 14 and a roof 16. The bin 10 serves as a housing for a bulk mass of pellets 17 to be passivated and, more specifically, in the test employed, had sufficient volume to hold approximately 12,700 cubic feet of pellets which had a weight of approximately 625 tons. The roof 16 is placed at an angle which approximates the angle of repose of the pellets 17 to be placed therein. Received within the roof 16 is an axially extending passageway 18 that is closed at its top and which receives a charge pipe 20 through which the metallized pellets may be introduced into the bin 10. The interior end of the charge pipe 20 has a flap 22, made of a material such as neoprene, so that the charge pipe may be closed to the atmosphere during periods other than loading. Located within the roof 16 is a level indicator that indicates the quantity of pellets within the bin. Immediately below the roof 16, and received within the upper portion of the wall 12, are a plurality of air vents 26, each of which is supplied with a vent flap 28 which also allows air to flow outwardly from the bin 10.

Intermediate the ends of the walls, an air line 30 is received which is connected to a fan 31 that is selectively operative to push air into the bin 10. A bustle 32 is located immediately inside the wall 12 and is closed at the top but open at the bottom. In this way, the air line 30 will not become plugged with pellets and the air is able to flow into the pellet bed. Located immediately above the bustle 32 is a pair of horizontal, inverted V-shaped cross members 34 which are at a right angle to one another and each of which is in open communication at its ends with the bustle 32. Air is received within the cross members 34 from the bustle 32 and is distributed generally equally throughout the area of the bin immediately below the cross members. The cross members 34 are provided with a support member 36 at their junction.

Located at the lower portion of the wall 12 are a plurality of discharge pipes 38 through which the pellets may be discharged after processing. Located at various points within the bin are gas sample outlets 40 through which gas may be removed from the bin to determine the level of oxygen present therein. Also received within the bin is a plurality of thermocouples 42, only one being shown, which measure the temperature at various locations.

Located within the bottom of the bin 10 is a layer of sand 44. This sand 44 assures the sealing of the bottom of the bin and eliminates the possibility of external air drafting in from below the pellet bed. Immediately above the sand is a layer of crushed stone 46, the crushed stone having an upper surface level which approximates the angle of repose of the metallized pellets. Immediately above the crushed stone and below the discharge pipes 38 is a section wherein "dead" pellets 48 remain.

The bin 10 used for the final investigations was 26 feet in diameter, 24 feet high and was instrumented with thermocouples 42 which were located two feet from the center line, three feet from the wall, and one foot from the wall. These locations are hereinafter referred to as "center", "mid" and "wall". Six couples 42 were located 4 feet apart vertically at each radius. Two gas sample 40 points were located just off the center line near the top and bottom of the bed.

Figure 2:
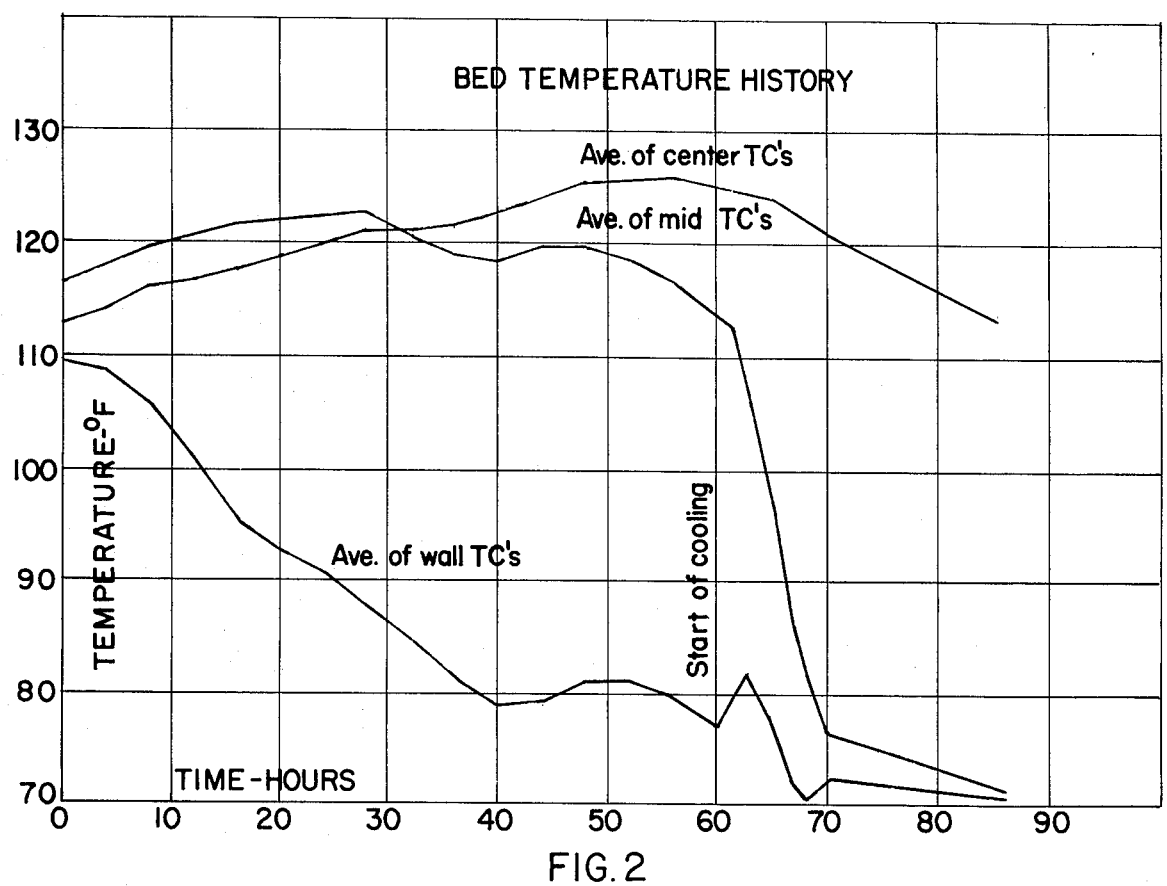
FIG. 2 is a graph showing the temperature profile of a passivation run carried out in the equipment shown in FIG. 1.
Figure 3:
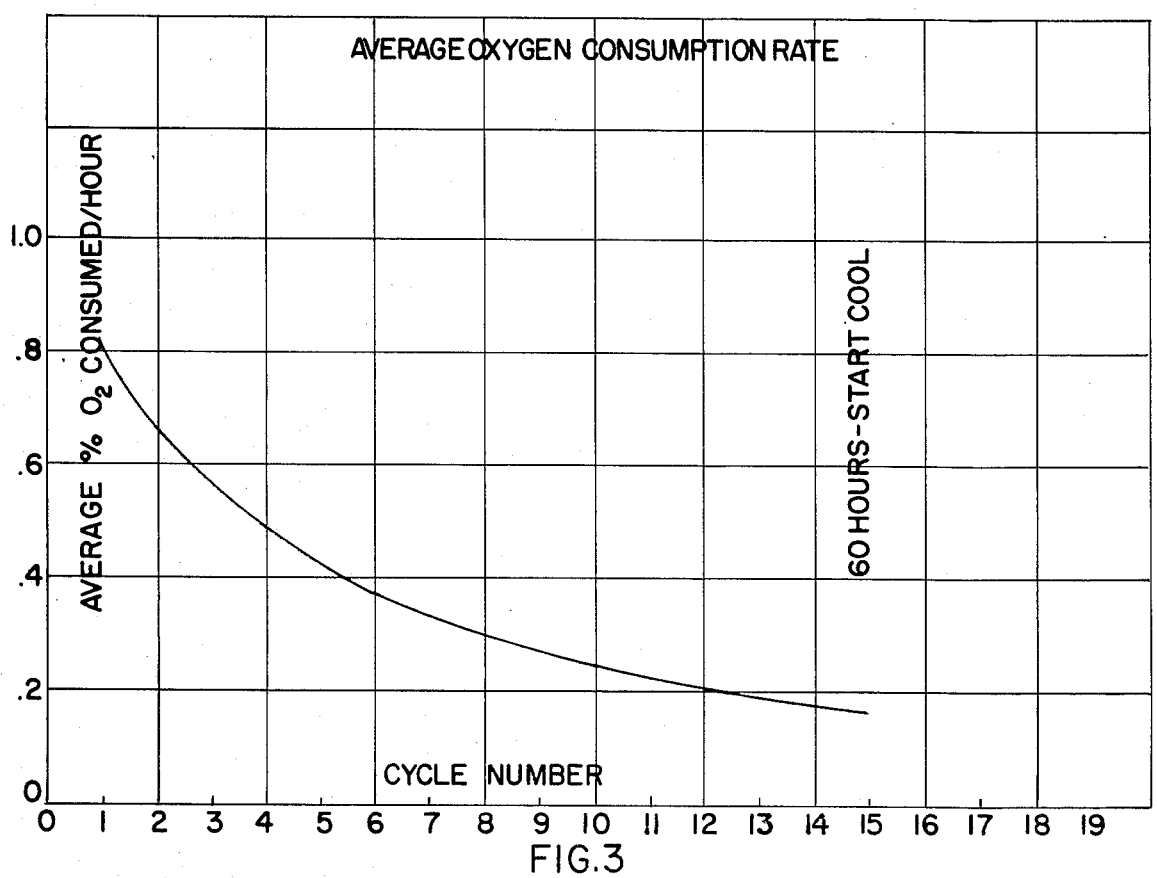
FIG. 3 is a graph showing the average oxygen consumption rate of a passivation run carried out in equipment of the type shown in FIG. 1.

In one run, loading of the bin 10 started and proceeded at about 100 tons per hour. In approximately 7 hours and 10 minutes, including a 1 hour delay, loading was completed and the bin 10 was purged with air by operating the fan 31 for 1 minute. Oxygen analyses at both gas sample 40 points and all temperatures were logged hourly. The bin 10 was purged for one minute every 4 hours for a total period of 60 hours. After this time, all couples 42 indicated that the pellets had cooled or had been static for two purge periods. After the passivation was completed, the pellets were cooled by continually operating the fan 31 and the bin was subsequently unloaded. Temperature history and oxygen consumption are shown in FIGS. 2 and 3, respectively. It is noted from data shown in FIG. 2 that the maximum temperature of the bulk mass was less than 130°F. and that, after 24 hours, the rate of temperature rise generally leveled off. FIG. 3 shows that the rate of oxygen consumption decreased rapidly during the first cycles thus showing the effect of passivation.

The following points were observed:

1. The average of all bed couples at the start of the passivation run was 112°F.
2. During passivation the average rise of the center couples was 13°F., mid couples 8°F. and wall couples 0°F.
3. The rate of oxygen consumption varied from 0.82%/hr. during the first purge cycle to 0.17%/hr. during the 15th cycle. The latter corresponds to a reactivity rate of 0.007 CFH $O_2$/LT pellets at 100°F.
4. Based on the average rate of oxygen consumption, the calculated decrease in metallization was 0.04%.
5. After 25 hours of cooling, the bulk of the mass was at a temperature of approximately 75°F.
6. Temperatures were taken of samples from each truck into which pellets were dumped during a four hour unloading period. These varied from 68°–74°F.
7. The level of oxygen was measured in the bin during the run. The bin was initially purged with air for one minute every four hours, in 15 cycles. Immediately before each purge, the oxygen level in the bin was checked with the following results:

TABLE III

| Elapsed Time (Hrs.) | % $O_2$ in Bin | Elapsed Time (Hrs.) | % $O_2$ in Bin |
|---|---|---|---|
| 4 | 13.4 | 36 | 19.2 |
| 8 | 15.4 | 40 | 19.4 |
| 12 | 16.6 | 44 | 19.2 |
| 16 | 17.4 | 48 | 19.6 |
| 20 | 18.2 | 52 | 19.6 |
| 24 | 18.2 | 56 | 19.8 |
| 28 | 18.6 | 60 | 19.8 |
| 32 | 18.8 | | |

Referring to Table III and FIGS. 2 and 3, it is shown that as the temperature of the bed rises, the oxygen consumption rate decreases and this indicates that a decrease in reactivity (passivation) is occurring because reactivity normally increases as a function of temperature to the 8.53 power as set forth above. Furthermore, Table III and FIG. 2 indicate that when the temperature of the bed ceases to materially rise and/or the oxygen consumption rate approaches zero, the reaction of the pellets with oxygen has been substantially reduced to the point where passivation has occurred. It was found in the above test that maintaining the bulk mass in a quiescent state resulted in a metallic loss of approximately 0.04 percent. This occurred when the atmosphere was changed or purged once every four hours. Though this proved to be a convenient cycle, others are acceptable. Basically, the method should comprise purging the reacted gas within the bin by gas containing oxygen at periodic intervals, then allowing the bulk mass to remain in a quiescent state between purges by stopping air from drafting through the mass. When it is determined that the oxygen consumption rate approaches zero or the temperature rise materially ceases, then a cooling gas or air may be circulated through the bin to effect cooling of the passivated pellets. Since the reactivity rate of a fresh pellet is related to the 0.28 power of the oxygen concentration, it is not mandatory for the oxygen level to be kept high. As stated previously, the rate of reactivity in an atmosphere containing 2 percent oxygen will be half as fast as the rate in ambient. Obviously, if time is of the essence, the passivation process may be accomplished faster by preventing the percentage of oxygen from falling too greatly. For example, the percentage of oxygen could be maintained at a high level by supplying additional air whenever the oxygen level falls to or below 15 percent. On the other hand, the periodic cycling or purging of air through the bulk mass should not be too frequent as this could have a cooling effect upon the bulk mass and tend to inhibit the passivation.

Metallized pellets which had been treated experimentally in the laboratory at 400°F., which experiment was described previously in this specification, had lost approximately 1.0 percent metallization and other pellets treated at 600°F. had lost approximately 4.0 percent metallization. A loss of 1.0 percent is as high a loss as one would want to suffer, consequently, treating at 400°F. is considered the upper acceptable limit in passivation of pellets. Preferably, the pellets should be passivated between 110°–250°F. to achieve even less metallization loss. This is in keeping with the belief that successful bulk passivation may be achieved without excess heating by creating quiescence in the pellets, i.e., no wind drafting.

What is claimed is:
1. In a method of passivating metallized iron pellets, a substantial portion of which have a particle size greater than 0.02 cubic inches, the steps comprising:
    placing a bulk mass of metallized iron pellets in a sealable container having a gas inlet opening, a gas outlet opening and means for supplying gas to the inlet opening;
    purging the container with a gas containing oxygen for a discrete period of time sufficient to replace the gas previously contained within said container;
    sealing the container and maintaining the bulk mass in a quiescent state wherein no wind drafting is permitted across the bulk mass for a time sufficient for said bulk mass to consume substantially all the available oxygen within the sealed container;
    and repeating said purging and quiescent steps until the bulk mass substantially ceases to consume the oxygen supplied or until the bulk mass substantially ceases to heat; the number of said purging and quiescent steps and said predetermined time period of said quiescent state being selected to optimize the retained metallization of said pellets.
2. The method of claim 1 wherein a cooled gas is circulated through the bulk mass to force cool the pellets after the periodic cycling ceases.
3. The method of claim 1 wherein air is supplied as the oxygen containing gas.
4. The method of claim 1 wherein the loss of retained metallization of said pellets is a maximum of one percent.

* * * * *